Aug. 29, 1939.   H. H. HOPKINS   2,171,113
APPARATUS FOR DETECTING LEAKAGE
Filed Aug. 6, 1936   5 Sheets—Sheet 1

INVENTOR
HOWE H. HOPKINS
BY
ATTORNEY

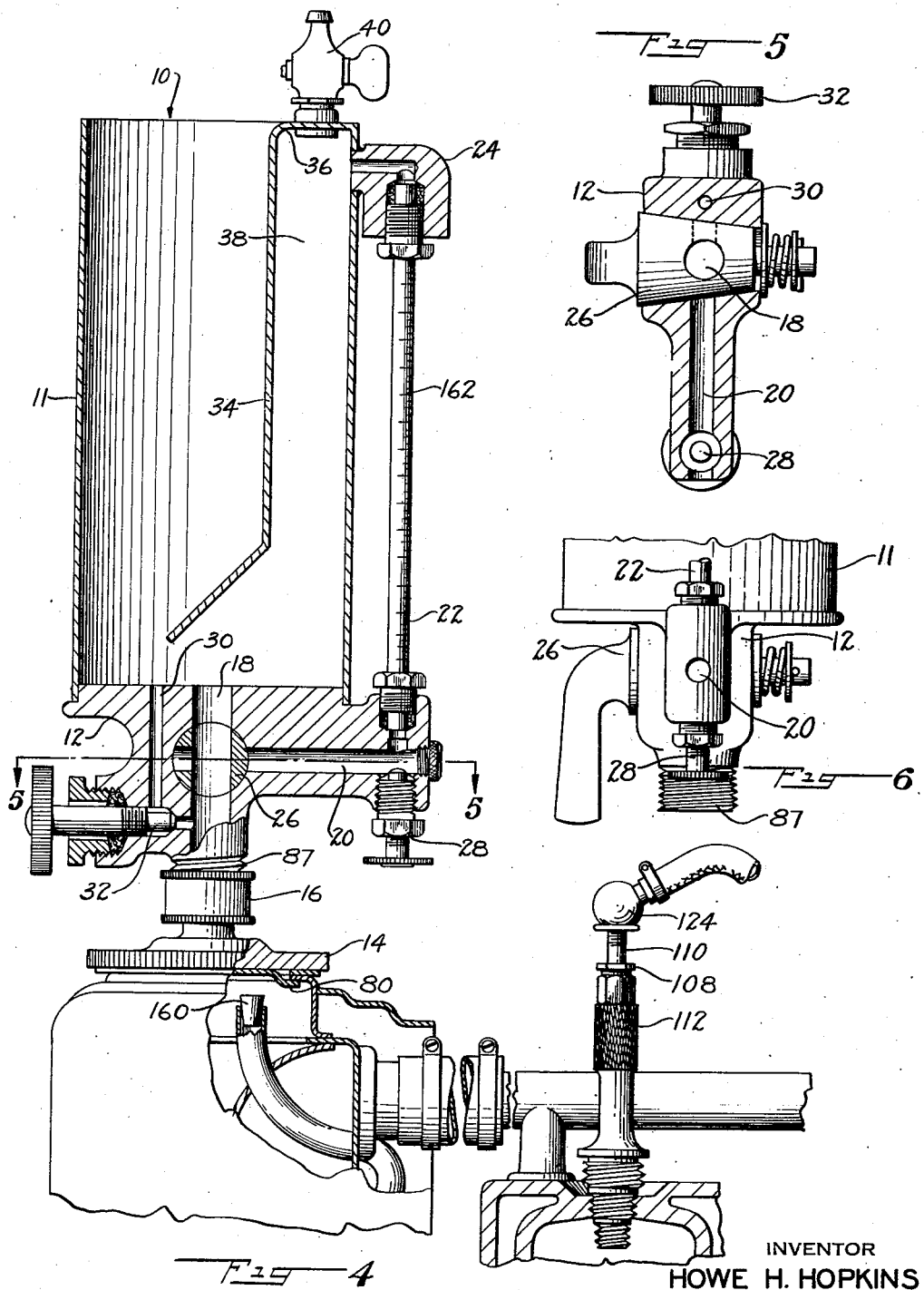

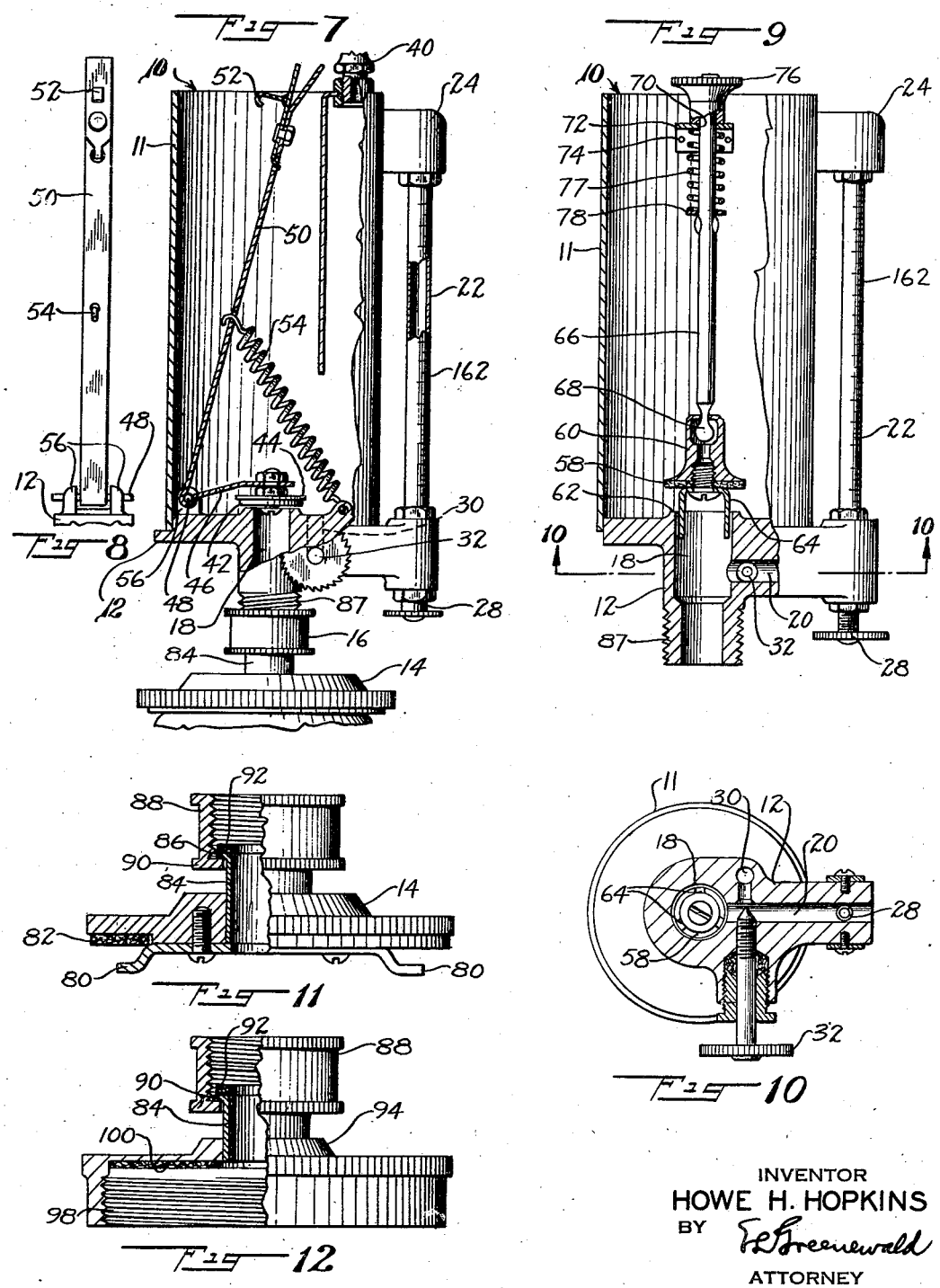

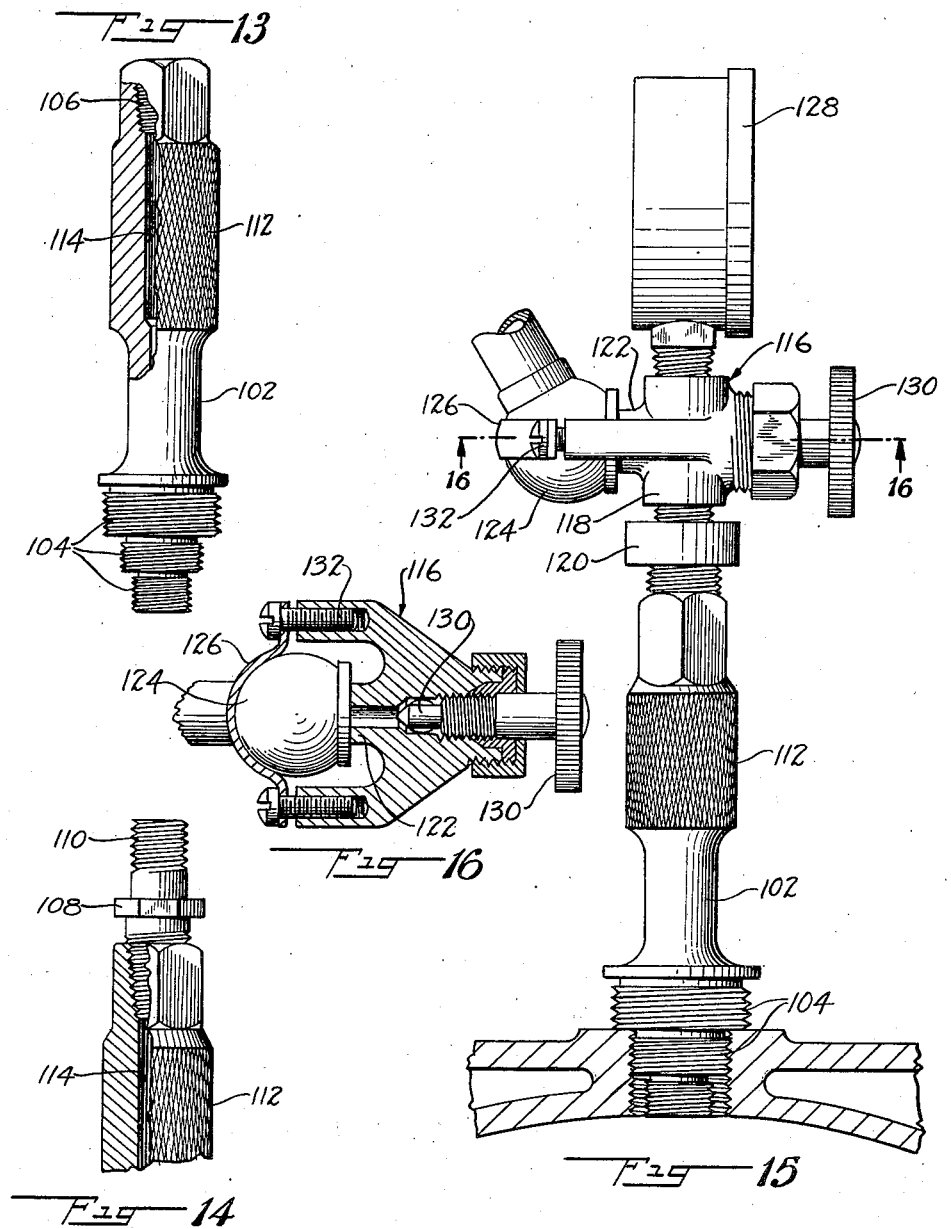

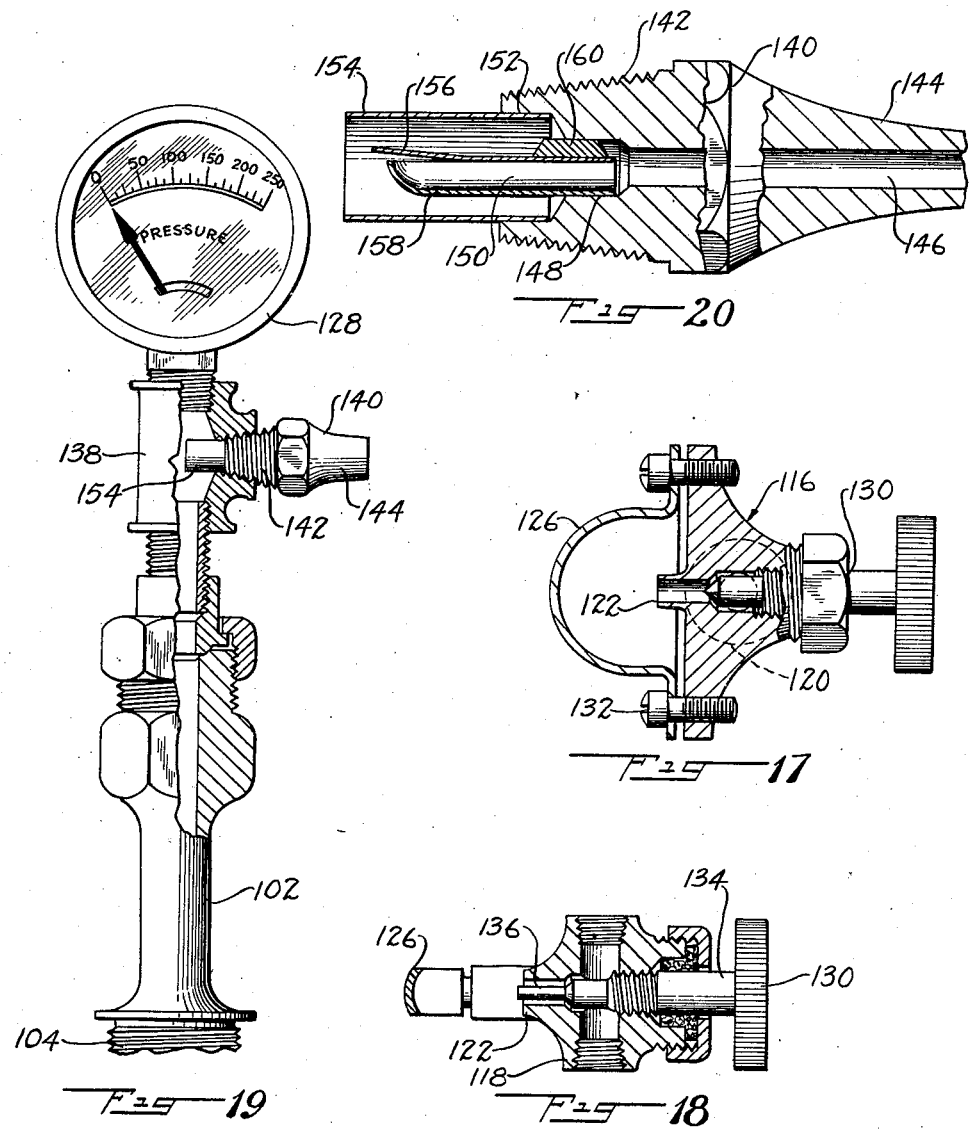

Patented Aug. 29, 1939

2,171,113

UNITED STATES PATENT OFFICE 2,171,113

APPARATUS FOR DETECTING LEAKAGE

Howe H. Hopkins, Detroit, Mich., assignor to National Carbon Company, Inc., a corporation of New York Application August 6, 1936, Serial No. 94,538

12 Claims. (Cl. 73—51)

This invention pertains to apparatus for detecting leakage into a fluid chamber, or between two normally separated chambers having a common wall, of which one chamber may contain higher pressure than the other and the low pressure chamber may contain a liquid. More specifically the invention pertains to apparatus for detecting leakage of combustion gases from the combustion chambers to the fluid cooling system of an internal combustion engine such as those employed in automotive conveyances.

Modern liquid cooled internal combustion engines are especially subject to leakage of exhaust gases from the combustion chambers into the liquid chamber of the cooling system. These combustion gases contain elements which create powerful corrosive agents when dissolved in a cooling liquid containing water and the agents formed are believed to be chiefly carbonic acid and sulphurous acid. The degree of leakage may be relatively small and cause no discernible change or effect in the operation of the engine, and it may exist unknown for a relatively long period of time until the engine has become permanently damaged.

The acids produced by such leakage may cause excessive corrosion or rusting of the walls of the cooling system, clogged or leaky radiator, or overheating of the engine. Also, the gases may become trapped in the cooling system thereby causing "hot spots" or "steam pockets" and loss of the cooling fluid by expansion of the steam. These "hot spots" increase the tendency for cracks to develop in the engine castings and they also tend to shorten the non-corrosive life of anti-freeze solutions which may be used in the cooling system during cold weather. The leakage usually occurs at the gasket between the cylinder and cylinder head, and continued leakage, even in small quantities, insufficient to affect the operation of the engine or cause loss of solution, may cause sufficient corrosion and erosion of the gasket surface of either the head or cylinder block, or both, to necessitate replacement in order to correct the trouble. In cases of excessive leakage the cooling solution may enter the combustion chamber and pass the piston into the crankcase, where it may cause lubrication failure. Furthermore, leakage of the cooling solution into the combustion chamber may cause scoring of cylinders, burned valves, and cracked valve seats.

Therefore, the chief object of this invention is to provide apparatus for indicating or detecting leakage into a chamber or between two normally separated chambers having a common wall such as between the combustion chamber and a liquid chamber of the cooling system of an internal combustion engine. Other objects are to provide a leakage detector that is simple in structure, highly sensitive in action, and relatively quick in operation. Still other objects are to provide a leakage detector that may quickly and easily be placed in operation, and may be readily attached to the cooling system of practically any modern automotive conveyance. These and other objects and novel features of the invention will be more fully illustrated by the following specification and the accompanying drawings, in which:

Fig. 4 is a sectional view of the preferred embodiment of the leakage detector operatively connected with the cooling system of an internal combustion engine, of which only a fragment is shown;

Fig. 5 is a sectional view of the main valve of the leakage detector taken along the line 5—5 of Fig. 4;

Fig. 6 is a fragmentary side view of the main valve shown in Fig. 4;

Fig. 7 is a side view of another embodiment of the invention partially broken away to show the structure of a different type of main valve;

Fig. 8 is a fragmentary view of the means for supporting and operating the main valve shown in Fig. 7;

Fig. 9 is a vertical sectional view of another embodiment of the invention showing a still different type of main valve;

Fig. 10 is a horizontal sectional view taken along the line 10—10 of Fig. 9;

Fig. 11 is a side view of one form of adaptor for attaching the leakage detector to the radiator filling opening of an automobile, with a portion broken away to show the interior structure;

Fig. 12 is a side view similar to that shown in Fig. 11 but adapted for being attached to a different type of radiator filling opening;

Fig. 13 is a side view partially broken away of an adaptor for applying air pressure to the combustion chamber of an internal combustion engine;

Fig. 14 is a fragmentary side view partially broken away of the adaptor shown in Fig. 13 provided with an air hose connection;

Fig. 15 is a side view of an adaptor similar to that shown in Fig. 13 provided with a pressure gauge, hose connection, and control valve;

Fig. 16 is a horizontal sectional view taken along the line 16—16 of Fig. 15;

Fig. 17 is a horizontal sectional view similar to Fig. 16, showing an alternative structure;

Fig. 18 is a fragmentary vertical sectional view of the control valve shown in Fig. 15 provided with a different type of valve stem;

Fig. 19 is a side view, partially in section, of another adaptor provided with an audible signal; and Fig. 20 is a sectional view of the isolated signal.

Figure 1:
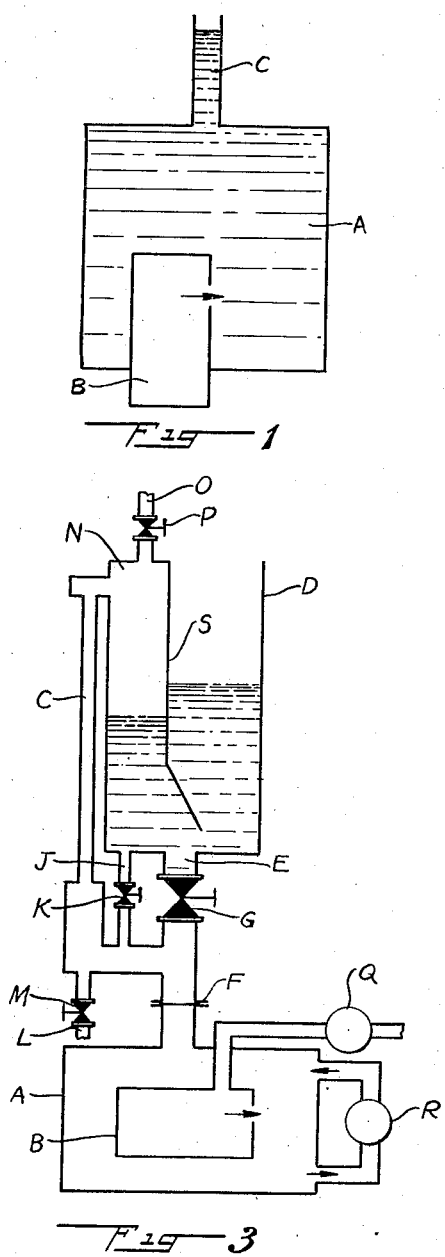
Fig. 1 is a schematic view illustrating the basic principle of the operation of a detector.

The leakage detector is based upon the principle that leakage into a fluid chamber that is vented to the atmosphere through a liquid level indicator, such as a relatively small transparent tube or a tube having a transparent portion partially filled with liquid, will be immediately indicated by a visible rise in the level of the liquid in the indicator or tube. This principle of operation is illustrated in Fig. 1, wherein A is a fluid chamber under observation such as that of a cooling system of an internal combustion engine. Leakage into the chamber A may enter through an opening in a common wall between the chamber A and an associated chamber B which may be a combustion chamber of an internal combustion engine. To indicate this leakage, the chamber A may be vented to the atmosphere through a liquid level indicator such as a relatively small transparent tube C partially filled with a visible liquid, so that any leakage into the chamber A causes a visible rise in the surface or level of the liquid in the transparent tube C. To increase the rapidity of operation, the chamber A and the lower portion of the tube C may be filled with a liquid and then although the leakage into the chamber may be a gas, it will displace part of the liquid in the chamber A and cause an immediate visual rise in the level of the liquid in the tube C.

Figure 2:
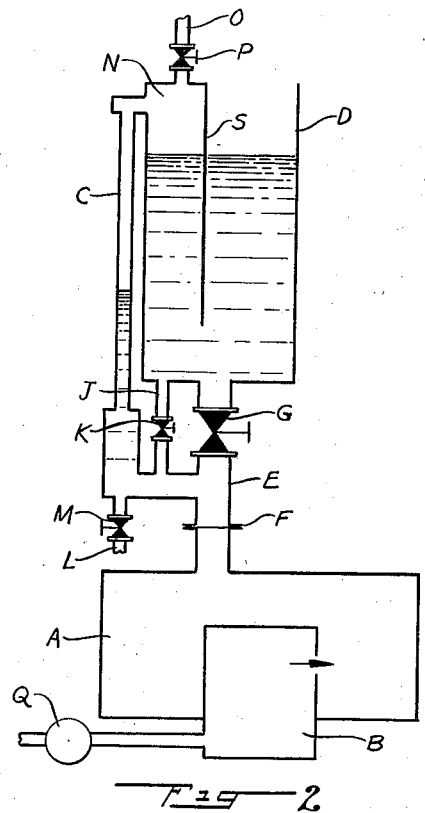
Fig. 2 is a schematic view showing the application of the detector to a system having leakage of a single fluid.
Figure 3:
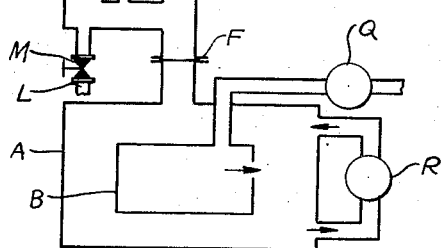
Fig. 3 is a schematic view showing the application of the detector to a fluid circulating system having a leakage of two fluids.

In a system such as that shown in Fig. 1, the small size of the transparent tube C renders filling difficult, therefore, in addition to the tube C the detector may comprise a suitable tank D as shown in Figs. 2 and 3. This tank may be open at the top and the lower portion may be connected by a passage E with the top or upper portion of the chamber A under test by a suitable coupling F. The transparent tube C may be connected between the upper end of the tank D and the upper portion of chamber A, and the tank D may be provided with a suitable valve G for closing the upper end of the passage E. After the chamber A and part of the tank D and tube C have been filled with liquid, the valve G may be closed and any changes in volume in the liquid in chamber A may be indicated by the level of the liquid in the tube C. However, since the liquid level in the tube C may move beyond the visible range, other means may be provided for controlling its level.

This means may comprise a relatively small passage or bypass conduit J, around the valve G, provided with a valve K therein by which the liquid level in the tube C may be raised, and the passage connected with the lower end of tube C may be provided with a drip or outlet opening L having a valve M therein by which the level of the liquid in the tube C may be lowered.

In addition to leakage from the chamber B into the chamber A, the detector may also indicate leakage into the chamber A through a loose gland or packing at the inlet side of a water circulating pump R. Therefore, the gas leakage into the chamber A may comprise more than one gas, and in this case it may be desirable to collect a specimen for analysis to determine its injurious nature. For this purpose, a liquid sealed chamber N in communication with the upper end of the tube C may be provided. Then any gas escaping through the tube C may be collected in the chamber N, and later drawn off through an outlet O by opening the valve P. Also, when the leakage into the chamber A is of relatively large volume or the pressure from a suitable source Q is relatively high, it may be desirable to open the valve G and let the gas pass directly from the conduit E into the collecting chamber N. For this purpose the partition S separating the collecting chamber N from the rest of the tank D may extend over the upper end of the conduit E so that the upper end of this conduit opens directly into the chamber N. An opening should be provided, however, between the lower end of the partition S and the bottom of the tank so that the chamber A will always be vented to the atmosphere as shown in Fig. 3.

Figs. 4, 5 and 6 illustrate a structural embodiment of the leakage detector shown schematically in Figs. 2 and 3. This leakage detector may be provided with a tank 10, having a side wall 11 of suitable contour such as cylindrical, rigidly secured to a suitable base 12 which may be a metal casting. The lower portion of the base 12 may be provided with a suitable coupling part or cap 14 adapted for being secured to the filling opening of a radiator, and the base 12 may be secured to the cap 14 by a separable coupling 16 so that caps fitting different types of radiator openings may be used with the detector. The base 12 may be provided with a suitable passage 18 leading downwardly from the bottom of the tank 10 to the interior of the radiator to which the detector is coupled, and also with a lateral passage 20 leading to the lower end of a gauge glass 22 having its lower end secured in a portion of the base extending outwardly beyond the periphery of the side wall 11 and its upper end suitably secured in a fitting 24 communicating with the upper portion of the tank 10. The base 12 may be provided with a suitable valve or cock 26 at the junction of passages 18 and 20 so that either or both of the passages to the tank or to the gauge glass may be closed. Also, the passage 20 may be provided with a drain valve or cock 28 for lowering the liquid level in the gauge glass, and the base 12 may be provided with a closable bypass passage 30 leading from the bottom of the tank into the passage 18 below the valve 26 for raising the liquid level in the gauge glass when a suitable valve 32 in the passage 30 is opened. The interior of tank 10 may be provided with a suitable partition 34 terminating adjacent the bottom of the tank or base 12 and the portion of the tank at the side of the partition adjacent the gauge glass may be closed by a top wall 36 thereby forming a gas collecting chamber 38. The lower portion of the partition 34 should terminate at such point that any gas escaping from conduit 18 into the tank will flow into the gas collecting chamber. Also, the upper portion of the gas collecting chamber may be provided with a suitable outlet cock or valve 40 through which any gas in the chamber 38 may be drawn off for analysis. The size of the tank and most of the passages are not critical. However, it has been found that the size of the passage 18 should be substantially ⅜ of an inch in diameter in order to allow air in the radiator to escape while it is being filled through the tank 10. Also, the inside diameter of the gauge glass should be substantially ⅛ of an inch, since it has been found that the sensitivity of a larger glass is less due to its larger volume, while the sensitivity of a smaller glass is less due to its capillary action. The valves 28 and 32 may be of any suitable type that will open and close gradually so that small quantities of liquids may be admitted to or drawn from the gauge glass to control the level therein. Valve 40 may be of any suitable type although a plug type valve such as a petcock is especially suitable because a rubber tube may be readily connected to the outer end to draw off the gas from the chamber 38. Valve 26 may be of the plug type having three operating positions but other suitable types may be employed.

A leakage detector is shown in Figs. 7 and 8 having a different type of valve for closing the passage 18. This valve may comprise a suitable packing or sealing washer 42 suitably supported by a rigid disc 44 adapted to close the upper end of the passage 18. This valve may be carried by the short arm 46 of a bell crank supported by a suitable pivot 48 located at one side of the tank 10, and the long arm 50 of this bell crank may extend upwardly above the top of the tank and be provided with a suitable latch 52 adapted for releasably engaging the upper edge of the cylindrical tank wall 11. This valve may be held closed by suitable means such as a coil spring 54 having one end secured to the base 12 within the tank at the side opposite the pivot 48, and the other end secured in an opening in the long arm 50 of the bell crank a suitable distance above the pivot 48. The bell crank may be of sheet material formed with a suitable loop encircling the pivot pin 48 which may be carried by suitable base lugs 56 integral with or rigidly secured to the base 12. The lugs 56 may be located on each side of the bell crank, and the pivot 48 may be any suitable pin such as a cotter pin. Therefore, this valve 42 may be held in open position by the latch 52 and when unlatched may be held in closed position by the spring 54. However, a valve of this type may be carried by means other than the bell crank.

In Figs. 9 and 10 a leakage detector is shown having a still different type of valve closing the upper end of the passage 18. This valve may comprise a suitable packing or resilient washer 58 rigidly secured to an appropriate support 60, and it may be maintained in operative relation with a suitable seat 62 surrounding the upper end of the passage 18 by a suitable number of guide members 64 rigidly secured to the valve 58 and extending downwardly into the passage 18 a distance greater than the movement of the valve. The position and movement of the valve 58 may be controlled by a suitable valve stem or rod 66 having the lower end thereof movably secured to the support 60 by a movable joint such as a ball joint 68. This joint may comprise a ball or rounded end formed at the lower end of the valve stem 66 movably secured in a suitable recess in the upper end of the valve support 60. The upper end of the valve stem 66 may be movably mounted in a suitable opening 70 in a cross member 72 secured near the top of the inner wall of the tank 10 by appropriate means such as rivets 74, and manually moved by a suitable thumb nut 76 in threaded engagement with the stem 66 and normally resting upon the upper surface of the cross member 72. Also, the valve may be closed by a suitable coil spring 77 surrounding the valve stem 66 and held under compression between the lower side of the cross member 72 and a suitable washer 78 secured to the valve stem an appropriate distance below the cross member. The frictional engagement of the washer 78 with the pressed ears on shaft 66, due to the compression of spring 77, prevents shaft 66 from turning when nut 76 is rotated. In this structure the valve 58 may be opened by rotating the nut 76 so that the valve is raised from its seat, and closed by rotating the nut in the opposite direction so that the spring 77 holds the valve securely upon its seat.

As already explained, the leakage detector may be coupled to or connected with a chamber under test, such as the radiator of a cooling system, by a suitable cap or coupling 14 as shown generally in Fig. 4, and more in detail in Fig. 11. The lower portion of this coupling may correspond to a radiator cap of standard type, and be provided with two downwardly extending arms 80 adapted to pass through suitable openings in the flange of the radiator and upon rotation engage the inner surface of this flange and force the gasket 82 into sealing engagement with the outer surface. The upper portion of the coupling may be provided with a separable connection comprising a hollow neck 84 having an out-turned flange 86 at the upper end thereof located within a suitable coupling nut 88 having a lower end 90 extending inwardly below the flange 86. A suitable packing washer 92 may be located within the nut 88 upon the flange 86 so that the threaded portion 87 of the base of the tank may be inserted in the nut 88 and forced into sealing engagement with the flange 86 and washer 92.

A coupling is shown in Fig. 12 for connecting the leakage detector with radiators having threaded necks. The lower part of this coupling 94 may be provided with an internally threaded skirt 98 adapted to secure the coupling to the threaded neck of a radiator. It also may be provided with the usual packing washer 100 and the upper portion may be similar or identical with that shown in Fig. 11.

In testing the leakage of an automobile engine, pressure may be applied to all cylinders by operating the engine, or pressure may be applied to each cylinder individually from an outside source. For this latter purpose, an adapter 102 such as that shown in Figs. 13 and 14 is especially convenient. One end of this adapter may be provided with a plurality of threaded portions 104 of different sizes adapted to fit the more common sizes of spark plug openings, and the other end may be provided with a threaded socket 106 adapted to receive the threaded end of a standard connection. Also, this socket may be provided with a suitable reducer 108 having a threaded outer end 110 to which an air hose coupling may be connected. Between the ends of the adapter the central portion 112 may be knurled to facilitate insertion and the upper end may also be square or hexagonal so that a suitable wrench may be applied for further tightening. Also, the adapter may be provided with a central passage 114 for conducting the fluid into the cylinder to which the adapter is connected. Although this type of adapter is satisfactory in some instances, it may be desirable to provide it with different means for attaching a standard air hose nozzle, with means for indicating the pressure within the cylinder, and also with means for controlling the admission of the pressure fluid into the cylinder.

To accomplish these latter features, the adapter may be provided with a valve unit such as that illustrated in Figs. 15 to 18. This valve unit 116 may be provided with a suitable valve body 118 and a connection which may be joined to the adapter 102 by means of a coupling nut 120. This coupling nut may be loosened slightly to permit relative rotary movement between the valve body and the adapter when it is changed from one cylinder to another. This valve body may also be provided with a suitable nipple 122 adapted to receive a standard air hose connection or valve 124, a clamp 126 for securing the air hose fitting to the valve body, a suitable pressure gauge 128, and a valve 130 for controlling the flow of air into the cylinder. The clamp 126 may partially surround the hose fitting 124 and be secured to the valve body by suitable adjustable means such as screws 132. In case the hose connection 124 is provided with a valve that is not opened sufficiently by the nipple 122, the valve stem 134 may be provided with a suitable extension or longitudinal pin 136 that engages the air hose valve and holds it open a greater distance.

When each cylinder is tested individually, it is desirable to place the cylinder at the upper end of its compression stroke before fluid pressure is admitted. Since it is often difficult for an operator to readily determine this position quickly, the adapter may also be provided with a signal device to indicate the stroke and position of the piston in the cylinder under test. A signal device for this purpose and an adaptor with a signal device incorporated therewith are shown by Figs. 19 and 20. Instead of the valve unit 116, a three way coupling 138 may be connected between the adapter 102 and the pressure gauge 128 and a suitable nipple 140 having a signal device incorporated therein may be rigidly installed in the lateral opening in the coupling 138. The inner end of the nipple 140 may be provided with a suitable thread 142 by which it is secured in the coupling 138 and the outer end may be provided with a reduced extension 144 adapted to fit a standard air hose connection. The nipple may also be provided with a central passage 146 having a somewhat enlarged portion 148 adjacent the inner end in which a signal device 150 is secured and the passage may have a still larger portion 152 at the inner end in which a suitable shield 154 is secured. The signal device may be of any suitable type such as a pressure operated horn reed adapted to emit an audible signal when a fluid such as air is forced therethrough. The signal may comprise a metal reed 156 secured to a suitable holder 158 which may be provided with a cylindrical support 160 secured under compression in frictional engagement within the enlargement 148 of passage 146. The signal device may extend inwardly beyond the inner end of the nipple 140 and be protected by a surrounding cylindrical shield 154 secured under compression in the enlargement 152 and extending inwardly around the signal but spaced therefrom a suitable distance to provide a free space for its operation.

The above apparatus is especially adapted for detecting leakage into a fluid chamber and one method of conducting such a test comprises providing the fluid chamber with a vent to the atmosphere through a relatively small transparent tube, filling the chamber and part of the tube with a visible liquid, and then observing the rise in the level of the fluid in the transparent tube. When there is a possibility that more than one fluid is leaking into the chamber under observation, especially when both of these fluids are gases, the method of detection comprises venting the chamber to the atmosphere through a liquid sealed gas collecting chamber, collecting a specimen of the leaking gas or gases in the collection chamber, removing the collected specimen from the collecting chamber to a suitable container, and analyzing the specimen. When the chamber under observation is a fluid chamber of a fluid cooling system for an internal combustion engine, the method of operation may include other steps for determining the amount of leakage into the cooling system, determining the nature of the fluid entering the cooling system, and also determining the point of entrance or leakage into the cooling system.

For determining the leakage of gases from the combustion chamber to the fluid cooling system of the internal combustion engine of an automotive conveyance, the method of procedure may be as follows; the cover to the radiator filling opening or radiator cap may be removed and the upper end of the overflow pipe closed. This may be accomplished by inserting a suitable cork or stopper 160 in the upper end of the overflow pipe as shown in Fig. 4. After the overflow pipe has been closed, a leakage detector such as that shown in Fig. 4, may be connected with the radiator filling opening in place of the usual cap. With the leakage detector in place valves 28 and 32 are closed, valve 40 is opened, and valve 26 is turned so that the passage 18 is open to passage 20 as well as the bottom of tank 10. A suitable fluid such as water is then poured into the tank 10 until the cooling system and the tank are substantially full. After the tank has been filled, the valve 26 is turned so that the lower end of the passage 18 is connected to the passage 20, and the upper end of the passage 18 is closed. Then, valve 28 is opened and the liquid in tube 22 is drained out until the level is lowered to a suitably visible position near the lower end. The valve 40 may be closed or open during a leakage test; it need be closed only when it is desired to collect the leaking gas. With the leakage detector in this position the engine may be started or placed in operation to create a pressure in the combustion chamber greater than that in the cooling system, and then any leakage between the combustion chamber and the cooling system will be immediately indicated by a corresponding rise in the level of the liquid in the tube 22. In determining whether leakage is present, it is not necessary to wait for any gas entering this cooling system to appear in the tube 22 because the liquid displaced by the gas immediately rises in the tube 22 and indicates the leak although the gas itself has not become visible in the tube. In case the liquid level in the tube 22 should become too high or too low for observation, it may be lowered by opening the drain valve 28 or raised by opening the by-pass valve 32. In case this procedure indicates a leak into the cooling system, it may be desirable to determine the particular combustion chamber from which it entered.

In detecting a leaking combustion chamber or chambers, the leakage detector may be connected with the radiator filling opening and placed in condition for test in the manner already described, and a suitable adapter such as that shown in Fig. 19, inserted in the spark plug opening in one of the combustion chambers in place of the usual spark plug. Then, the engine may be slowly rotated until the audible signal in the adapter ceases to sound. This places the piston of this particular combustion chamber at upper dead center at the end of compression stroke with all valves closed. Although this position of the piston is very desirable or essential when conducting this test, it is often difficult to secure due to lack of means for locating its position. This audible signal, however, provides a quick and easy means for determining the position of the piston because the only time during its cycle when a pressure is created in the combustion chamber sufficient to sound the signal is during the compression stroke when the valves are closed, and as soon as the signal ceases to sound, it indicates that the piston is at upper dead center at the end of the compression stroke. With the piston in this position, the usual air hose such as employed for inflating tires may be connected to the nipple 140 and pressure applied to the combustion chamber under test. While the combustion chamber is under pressure, the level of the liquid in the tube 22 may be observed to denote whether there is leakage between this particular combustion chamber and the cooling system. Then the procedure may be repeated with each combustion chamber to determine from which chamber or chambers gas enters the cooling system. Under some conditions, however, gas may enter the cooling system from more than one source or from a source other than the combustion chamber and in this case, a different method of procedure may be followed.

This second gas may be of a relatively harmless nature, such as air, which may enter at the inlet side of the water circulating pump. Therefore, to determine whether the gases entering the cooling system are of an injurious nature, it may be desirable to collect a specimen for analysis. For this purpose, the method of procedure may comprise connecting the leakage detector to the radiator filler opening in the manner already described. With the leakage detector in place valves 28 and 32 are closed, valve 40 is opened and passages 18 and 20 are opened and connected by moving valve 26. Then a suitable fluid such as water is poured into the tank 10 until the cooling system, tube 22, tank 10, and chamber 38 are entirely or substantially full. Valve 40 is then closed and valve 28 is opened until substantially half the water in the tank 10 has been removed. Then valve 28 is closed and valve 26 is moved to close the upper end of the passage 18 and connect the lower end of passage 18 with passage 20. This leaves the cooling system, tube 22, and chamber 38 substantially or entirely full of liquid. With the leakage detector in this condition, the engine may be placed in operation and any gas or gases entering the cooling system will rise through the radiator, passages 18 and 20, tube 22, and displace the liquid in chamber 38 where they will be collected. During this procedure the liquid level in the tube 22 will indicate the amount of gas collected. When a sufficient quantity for analysis has accumulated in the chamber 38, the engine may be stopped and the specimen removed by connecting a suitable container with the upper end of the valve 40 which may be opened, and additional liquid may be poured into the tank 10 as necessary to displace the gas in chamber 38. Then the collected specimen may be analyzed by any suitable method.

To determine the amount of leakage during a period of time the detector may be provided with a suitable scale 162 located upon or in operative relation with the gauge glass 22. The scale may be calibrated in units of volume. Then by maintaining a uniform or equal pressure in the cylinders under test, the relative as well as the exact leakage of the cylinders may be accurately determined as follows. With the tank 10, chamber 38, and glass 22 filled with water, valve 26 is positioned either 90° or 180° in a clockwise direction from the position shown in Fig. 4. Valve 28 is then opened to permit draining water therethrough, and valve 40 is opened until the water within glass 22, tank 10, and chamber 38 reaches a datum line which may be marked zero and located at a convenient height on the glass 22. Valves 40 and 28 should then be closed, and valve 26 turned to establish communication between the lower part of passage 18 and passage 20 only. The graduation 162 below the datum line may increase in value and indicate the exact volume between chamber 38 and glass 22 above the water therein. Upon applying pressure to the cylinders, any leakage of air into the cooling system will cause momentary rises of the liquid level within glass 22. As the leakage continues, the air is collected at the top of glass 22 and passes into chamber 38 lowering the water level therein and raising the level of the water within tank 10. After a predetermined time, valve 26 may be turned to establish communication between the upper part of passage 18 and passage 20, thereby equalizing the levels within chamber 38 and glass 22; the reading on glass 22 will then indicate the volume of gas leakage over the predetermined time interval. This test is especially useful when determining the sealing ability of various types of gaskets.

When the leakage into the cooling system is of relatively large volume, such as often occurs at the inlet side of the water pump, the gas tends to pass outwardly through the detector in intermittent spurts so that it is difficult to observe the rate. The escape may be maintained at a relatively uniform rate however by allowing liquid to flow back into the radiator at substantially the rate it is carried out the gauge glass with the gas. This may be accomplished by starting the test with the tank about two-thirds full and then slowly opening the by-pass valve until the rate of escape through the gauge glass becomes uniform. For this test it is important that the by-pass passage 30 opens into the main passage 18 a substantial distance below valve 26 and gauge glass passage 20 to prevent the escaping gas from flowing outward through the by-pass passage.

Although a preferred embodiment of the leakage detection apparatus has been shown and described, it is obvious that various similar and equivalent elements may be employed and that these elements may be arranged in various similar and equivalent relative locations.

I claim:

1. A leakage detector for indicating gas leakage into a liquid chamber comprising a transparent tube adapted to contain liquid; a tank adapted to contain liquid; detachable means for connecting said tube and tank with said chamber; said detector having a passage therein between said chamber and the lower end of said tube, said detector being adapted to be filled with liquid, and means for controlling the height of liquid within said tube including means for admitting additional liquid to said tube from said tank, and for draining superfluous liquid from said tube.

2. A leakage detector for indicating gas leakage into the liquid chamber of a cooling system of an internal combustion engine comprising a tank adapted to be connected with said chamber; a transparent tube, the upper end of which is adapted to be opened to the atmosphere and the lower end thereof connected with said chamber by a liquid passage in the base of said tank; and valve means for establishing communication between said tank and chamber, said tank and tube, and said tube and chamber.

3. A leakage detector for indicating gas leakage into the liquid chamber of the cooling system of an internal combustion engine comprising a tank adapted to contain liquid and to be connected to said chamber; a transparent tube having the upper end thereof adapted to be opened to the atmosphere and the lower end thereof connected to said chamber by a passage in the base of said tank; and a valve for closing the passage between said tank and said chamber, the upper portion of said tank being open to the atmosphere, and the upper end of said tube being connected with the upper portion of said tank.

4. A leakage detector as specified in claim 2, in which the upper end of said tube is connected with the upper portion of said tank; the upper portion of said tank is open to the atmosphere; and said tank and said tube are substantially coextensive in height.

5. A leakage detector as specified by claim 2, in which the fluid passage connected with the lower end of said tube is provided with a closable drain outlet.

6. A leakage detector for indicating gas leakage into the liquid chamber of the cooling system of an internal combustion engine comprising a tank adapted to contain liquid and to be connected to said chamber; a transparent tube having the upper end thereof adapted to be opened to the atmosphere and the lower end thereof connected to said chamber by a passage in the base of said tank; and a valve for closing the passage between said tank and said chamber, the base of said tank being provided with a closable bypass passage around said valve.

7. A leakage detector for indicating gas leakage into the liquid chamber of a cooling system of an internal combustion engine comprising a tank adapted to be connected with said chamber; a transparent tube, the upper end of which is adapted to be opened to the atmosphere and the lower end thereof connected with said chamber by a liquid passage in the base of said tank; valve means for closing the passage between said tank and said chamber; said detector being provided with means adapted to form a gas collecting chamber having the upper portion connected with the upper end of said tube and the lower portion in communication with the lower portion of said tank.

8. A leakage detector for indicating gas leakage into the liquid chamber of a cooling system of an internal combustion engine comprising a tank adapted to be connected with said chamber; a transparent tube, the upper end of which is adapted to be opened to the atmosphere and the lower end thereof connected with said chamber by a liquid passage in the base of said tank; valve means for closing the passage between said tank and said chamber; said detector being provided with a water sealed gas collecting chamber having the upper portion thereof connected with the upper end of said tube, and the upper portion of said collecting chamber provided with a closable gas outlet.

9. A leakage detector for indicating gas leakage into the liquid chamber of the cooling system of an internal combustion engine comprising a tank adapted to contain liquid and to be connected to said chamber; a transparent tube having the upper end thereof adapted to be opened to the atmosphere and the lower end thereof connected to said chamber and said tank by a liquid passage; and valve means for closing the passage between said tank and said chamber and said tube and said tank, the base of said tank being provided with a coupling part adapted to be secured to the filling openindg of a radiator forming part of said cooling system.

10. A leakage detector for indicating gas leakage into the liquid chamber of the cooling system of an internal combustion engine comprising a tank adapted to contain liquid and to be connected to said chamber; a transparent tube having the upper end thereof adapted to be opened to the atmosphere and the lower end thereof connected to said chamber and said tank by a liquid passage; and valve means for closing the passage between said tank and said chamber and said tube and said tank, the base of said tank being provided with a coupling part adapted to be secured to the filling opening of a radiator forming part of said system, and a separable connection between said coupling part and said base.

11. A leakage detector adapted to be connected to the cooling system of an internal combustion engine comprising a tank adapted to contain water and to be placed in liquid communication with said cooling system; a partition within the tank for dividing the tank into a collecting chamber in communication with a portion of said tank that is open to the atmosphere; a gauge glass in communication with the top of said chamber and the bottom of said tank; and valve means for establishing communication between said tank and said cooling system, said tank and said gauge glass, and said gauge glass and said cooling system.

12. A leakage detector as claimed in claim 11 in which an auxiliary by-pass is provided between said tank and cooling system, opening into the latter at a point between the cooling system and said valve means; and a valve in said auxiliary by-pass.

HOWE H. HOPKINS.